United States Patent

[11] 3,549,176

| [72] | Inventor | Gilbert E. Contreras<br>Los Angeles, Calif. |
|---|---|---|
| [21] | Appl. No. | 771,403 |
| [22] | Filed | Oct. 29, 1968 |
| [45] | Patented | Dec. 22, 1970 |
| [73] | Assignee | Aeroquip Corporation<br>Jackson, Mich. |

[54] FLEXIBLE FLOW LINER FOR BELLOWS JOINTS
2 Claims, 1 Drawing Fig.

[52] U.S. Cl. ..................................................... 285/55,
285/226, 285/286
[51] Int. Cl. ..................................................... F16l 27/10,
F16l 51/02
[50] Field of Search............................................ 285/226,
227, 228, 229, 301, 300, 299, 114(Cursory), 55,
286(Cursory)

[56] References Cited
UNITED STATES PATENTS

| 2,406,234 | 8/1946 | Marancik et al. | 285/227X |
| 2,470,989 | 5/1949 | Keller et al. | 285/226X |
| 2,547,746 | 4/1951 | Cook | 285/227X |
| 3,029,094 | 4/1962 | Parlasca et al. | 285/114 |
| 3,044,805 | 7/1962 | McDonald | 285/226X |
| 2,934,095 | 4/1960 | Lockhart | 285/55X |
| 3,254,910 | 6/1966 | Poole et al. | 285/55X |

*Primary Examiner*—Thomas F. Callaghan
*Attorney*—Jerry K. Harness

ABSTRACT: A flexible corrugated bellows connects two flanged tubes of a fluid line. A liner is disposed within the bellows and is fabricated of woven wire braid. One end of the liner is fixed to one of the tubes and the other end has a guide which is slidable within the other tube.

PATENTED DEC 22 1970
3,549,176
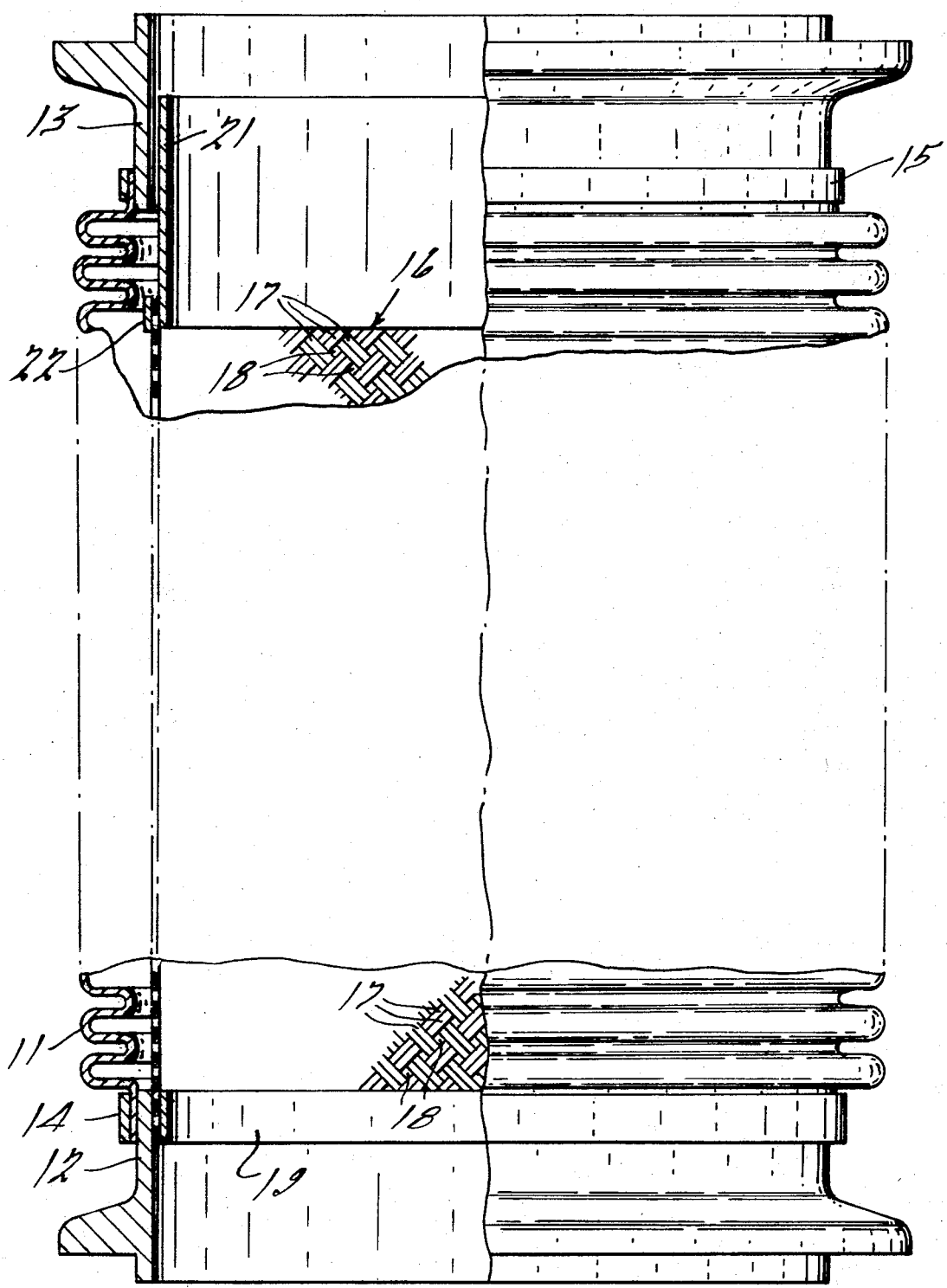
INVENTOR.
Gilbert E. Contreras
BY
Jerry K. Harness
His ATTORNEY.

FLEXIBLE FLOW LINER FOR BELLOWS JOINTS

BACKGROUND OF THE INVENTION

1. Field of the Invention

The invention relates to bellows joints for fluid lines which are to be installed with varying configurations, and more particularly to liners for the interiors of such bellows which reduce the turbulence and pressure drop which would otherwise be created by a fluid flow through the corrugated metal bellows section. Another purpose of having a liner within the bellows is to prevent flow-induced vibration which is normally encountered in unlined bellows at high flow rates.

2. Description of the Prior Art

In the past, solid liners have been mounted within the bellows to accomplish the purpose of avoiding turbulence and pressure drop through the bellows section. However, these liners permit only limited bending motion of the bellows. Moreover, because of the fact that the solid liner does not flex when the bellows is flexed laterally, it is necessary to provide a clearance space within the bellows, thus necessitating larger outside dimensions. The flexing of a bellows using a solid type of liner will also often reduce the flow area and increase the pressure drop, creating a throttling effect. Standard solid liners require a substantial amount of form tooling and have considerable weight, a disadvantage in installations such as hot air duct systems for aircraft.

SUMMARY OF THE INVENTION

The invention eliminates the above noted drawbacks of the solid liners by providing a liner which will, at all times, maintain its circular cross-sectional shape while preventing the turbulence, pressure drop and vibration encountered with unlined bellows.

Briefly, the invention comprises a tube fabricated of open mesh woven wire braid disposed within the bellows and fixed at one end to the fitting at one end of the bellows, the other end carrying a tubular guide which is slidable within the fitting at the other bellows end. The construction of this liner is such that when the bellows is angularly flexed or laterally offset, the liner will follow and conform to the cross-sectional shape of the bellows. When the bellows is expanded or contracted axially, the braided liner will merely stay in its unstressed position. Thus, the bellows may be made with an internal and external diameter no larger than that which it would need if unlined.

BRIEF DESCRIPTION OF THE DRAWING

The figure is a partially sectioned elevational view of a bellows section connecting two tubular members of a fluid line and having the novel liner of this invention.

DESCRIPTION OF THE PREFERRED EMBODIMENT

A conventional corrugated bellows section is indicated at 11. This bellows section is formed with convolutions permitting it to be extended or contracted in an axial direction, bent in an angular direction, or laterally offset, so as to vary the orientation between two portions of a fluid line. For example, bellows 11 may connect a pair of tubular members 12 and 13 having flanges thereon. The ends of bellows 11 are secured preferably by welding to members 12 and 13. The straps 14 and 15 act to reinforce the joint.

A liner generally indicated at 16 is disposed within bellows 11 and comprises a plurality of woven wire braids 17 which extend diagonally in opposite directions, forming small interstices 18 between them. The construction is such that liner 16 may be offset laterally or bent angularly a substantial degree in any direction without changing its circular configuration, the braids slipping relative to each other to accommodate the new shape.

The outside diameter of liner 16 is approximately the same as the inside diameter of tubular members 12 and 13, and the length of the liner is slightly somewhat less than the unstressed length of bellows 11. One end of liner 16 is secured preferably by welding against the inside surface of member 12. This joint is reinforced by a band 19. A thin-walled solid tubular sleeve 21 is secured preferably by welding to the other end of liner 16 and extends therefrom partially into tubular member 13, being spaced slightly inwardly therefrom. A band 22 surrounds the liner and reinforces this joint.

In operation, fluid flowing between tubular members 12 and 13 of the fluid line will pass through and be guided by liner 16. The liner will thus maintain the flow in a continuous and normal path with an essentially constant flow area, preventing the pressure drop, vibration and turbulence which would occur if the bellows were unlined.

If it is desired to install tubular members 12 and 13 further apart or closer together than the unstressed length of bellows 11, the bellow may be expanded or contracted without effecting the shape or length of liner 16, sleeve 21 merely sliding into or out of member 13 for this purpose. If the installation requires a lateral offset between members 12 and 13, relative angularity between these members, or both, the degree of this offset or angularity will be limited solely by the capability of bellows 11 itself. Liner 16 will conform to this shape by relative shifting of wire braids 17 in the manner previously described. This change in shape of liner 16 will not be accompanied by any change in its cross-sectional configuration, and since the circular cross-sectional shape of the liner will be maintained, it is unnecessary to construct bellows 11 any wider than as shown. It should also be noted that since the ends of the braided liner 16 are fixed solidly to the member 12 and the sleeve 21, the braid angle of the liner will not be changed any significant amount by pressures within the system.

I claim:

1. In combination with a corrugated bellows connecting two tubular members of a fluid line, a liner comprising a tubular member constructed of woven wire braid having a circular cross-sectional shape disposed within said bellows, means securing one end of said liner to one of said tubular members, and guide means secured to the other end of said liner and slidably connecting said other end to the other tubular member so as to permit relative axial movement between said other tubular member and said liner said liner being shorter than the unstressed length of said bellows, said means for connecting the other end of said liner to the second tubular member comprising a thin-walled solid tubular sleeve secured to said other end of the liner and extending therefrom, said sleeve being slidable within said second tubular member.

2. The combination according to claim 1 wherein the ends of the wire braided liner are welded to maintain a substantially uniform diameter of said liner.